C. J. GRAZER.
COMBINATION AUTOMOBILE CREEPER.
APPLICATION FILED JAN. 21, 1920.
1,394,493.
Patented Oct. 18, 1921.
3 SHEETS—SHEET 3.
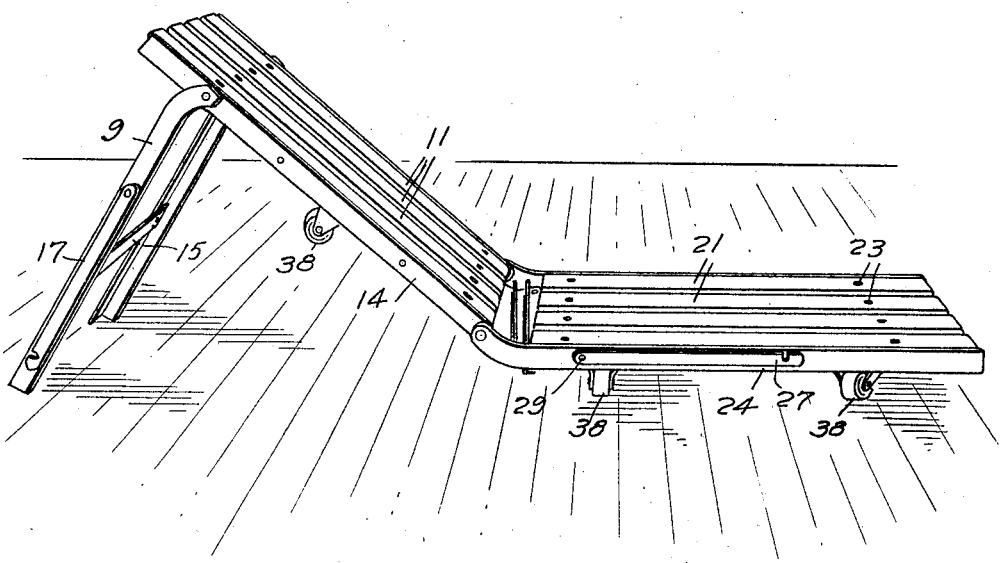
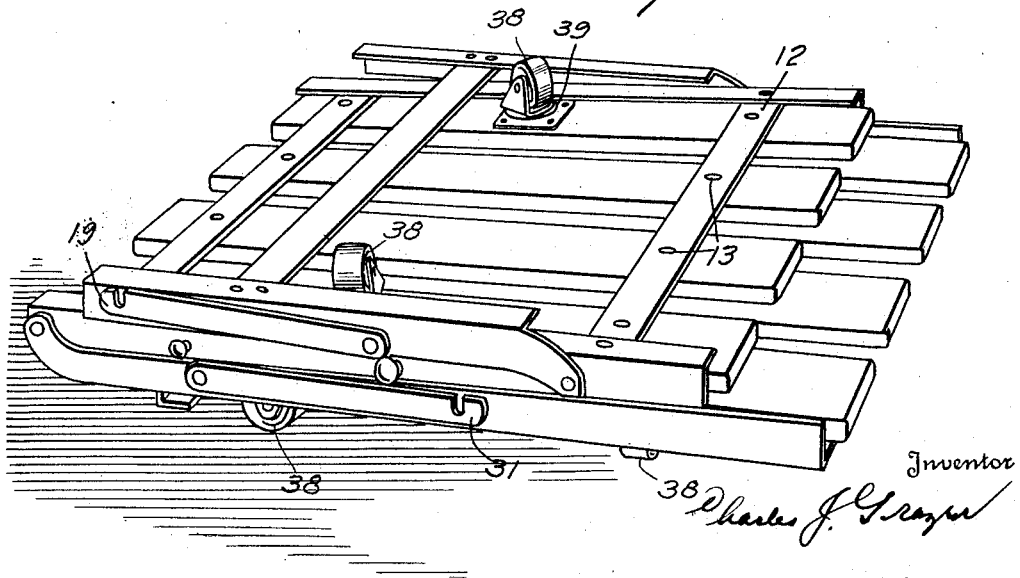
Inventor
Charles J. Grazer
By Harrell & Harrell
Attorney

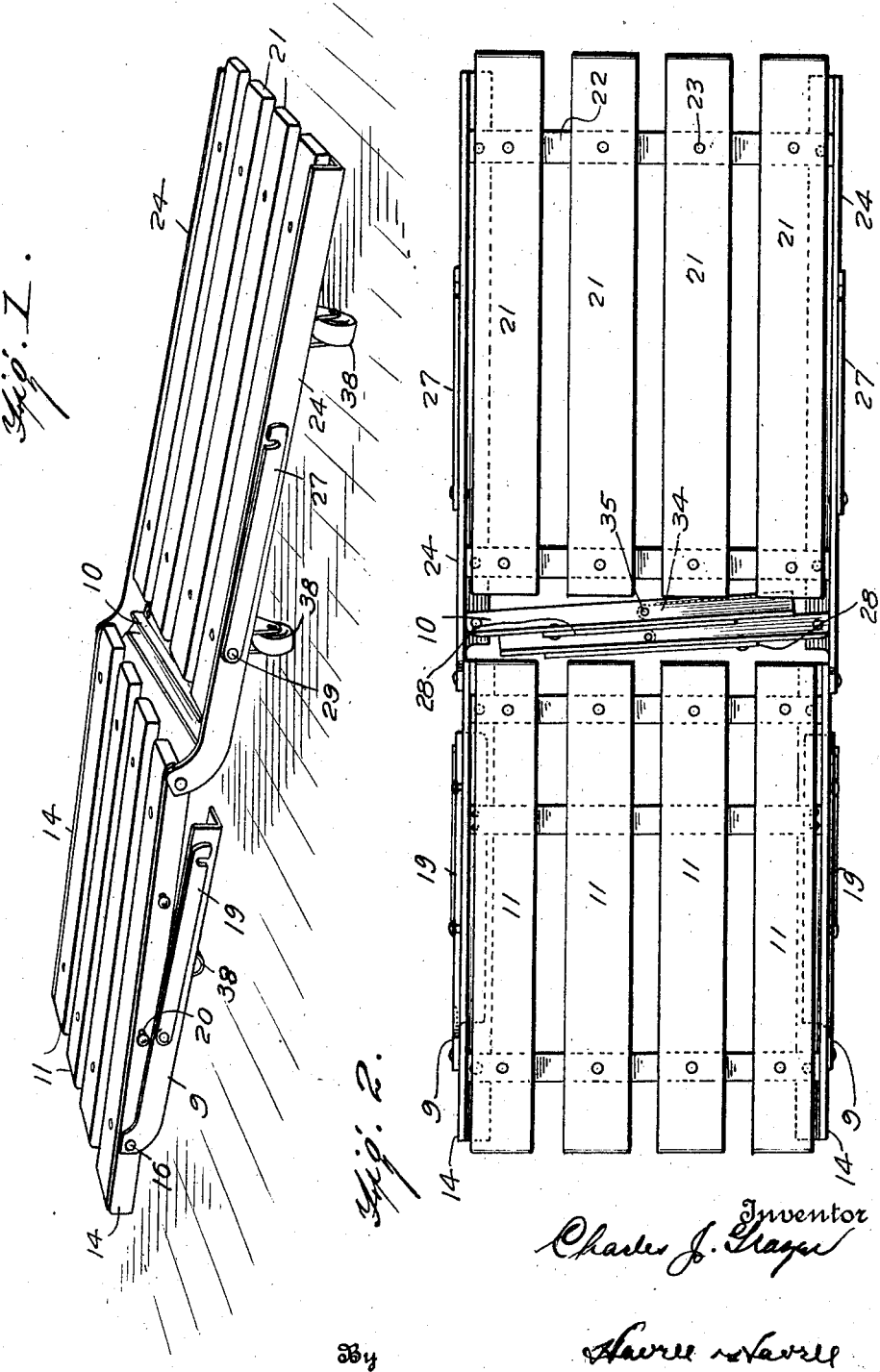

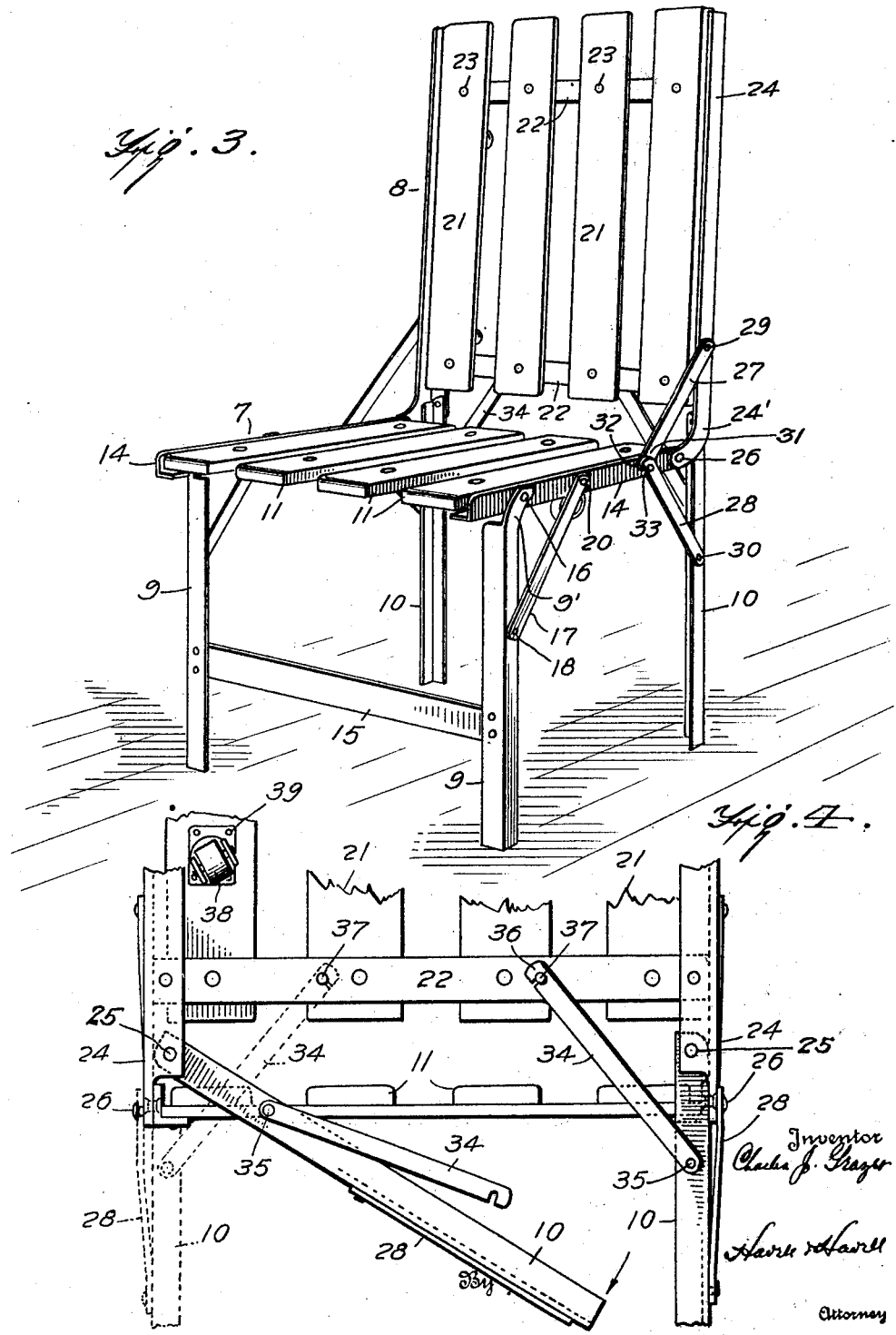

UNITED STATES PATENT OFFICE.

CHARLES J. GRAZER, OF PITTSBURGH, PENNSYLVANIA, ASSIGNOR OF ONE-HALF TO THOS. TREGANOWAN, OF PITTSBURGH, PENNSYLVANIA.

COMBINATION AUTOMOBILE-CREEPER.

1,394,493.   Specification of Letters Patent.   Patented Oct. 18, 1921.

Application filed January 21, 1920. Serial No. 353,126.

*To all whom it may concern:*

Be it known that I, CHARLES J. GRAZER, a citizen of the United States, residing at Pittsburgh, in the county of Allegheny and State of Pennsylvania, have invented new and useful Improvements in Combination Automobile-Creepers, of which the following is a specification.

The primary object of the present invention resides in the provision of a combination automobile creeper in the form of a shiftable sectional supporting platform the sections of which are capable of assuming different relative positions; the sections being further provided with pivoted chair legs, whereby the structure may alternately be rolled about underneath a motor vehicle or set up in the form of a chair.

With the above and other objects in view, the invention consists in the novel form, combination and arrangement of parts herein fully described and shown in the accompanying drawings wherein like reference characters indicate similar parts throughout the several views.

In the drawings,

Figure 1 is a perspective view of a combination automobile creeper constructed in accordance with the present invention, the same being illustrated in its rolling truck formation, Fig. 2 is a top plan view of the construction adjusted as shown in Fig. 1, Fig. 3 is a perspective view of the structure set up in chair formation, Fig. 4 is a fragmentary rear elevational view of a portion of the device as illustrated in Fig. 3, Fig. 5 is a perspective view of another form or position assumed by the structure, and Fig. 6 is a perspective view of the structure in completely folded position.

Briefly described, the present invention aims to provide the combination automobile creeper in the form of a plurality of foldable frame sections wherein the sections are capable of being set up to assume the general outlines of a chair embodying a seat, back and four supporting legs, and is also adapted to be folded into a substantially flat position supported upon shiftable roller bearings for readily positioning the same beneath an automobile, while an infinite number of angular positions of one frame section relative to another will be permitted. The device when out of use is folded into a neat and compact form consuming a relatively small space and also being comparatively light in view of the skeleton formation of the parts. While the creeper is more particularly intended for use around automobile repair shops and like places, it is to be understood that the same may be readily carried by an automobile or other vehicles for emergency repairing and providing an outside seat.

Referring more in detail to the accompanying drawings, attention is particularly called to Fig. 3, wherein the invention is illustrated in a set up chair formation, embodying a seat section 7, a back section 8, front supporting legs 9 and rear supporting legs 10. The seat section is formed of a plurality of slats 11 connected by cross arms 12 having fastening devices 13 passed therethrough while corner angle irons 14 brace the sides of the seat section 7.

The supporting legs 9 are of angle formation as illustrated in the several views of the drawings and are connected at their lower ends by the cross brace 15, the upper ends of the legs 9 being provided with extensions 9' pivotally secured as at 16 to the forward edges of the seat braces 14. In order to hold the legs 9 in the chair position illustrated in Fig. 3, links 17 are pivotally connected as at 18 to the legs 9 and have hooked ends 19 engaging over pins 20 carried by the adjacent faces of the side braces 14 whereby the legs 9 are held in a perpendicular position relative to the seat section 7.

The chair back 8 is formed of a plurality of slats 21 connected by cross braces 22 secured thereto by a fastening member 23 while side angle bars 24 are connected to the outermost slats 21 for purposes of bracing the chair back 8 and providing a supporting means for the rear legs 10. The legs 10 are of angle formation and have their upper ends pivoted as at 25 to the rear angle portions of the back braces 24 and are adapted to swing in vertical directions upon the pivots 25 to lie when folded in a position substantially at right angles to the longitudinal axes of the back slats. Forwardly curved lower end extensions 24' are carried by the back braces 24 and are pivotally connected as at 26 to the rear edges of the seat braces 14 whereby the back section 8 is hingedly connected to the seat section 7.

In order to hold the back section 8 in the vertical position illustrated in Fig. 3 and with the legs 10 perpendicularly arranged relative to the seat 7, there is provided a plurality of brace links comprising links 27 and 28 pivoted as at 29 and 30 to the back braces 24 and the rear legs 10 respectively while the free hooked ends 31 and 32 of said links engage over a pin 33 carried by the outer face of the seat braces 14. As a further means for holding the legs 10 in set up position, there is provided a link 34 pivoted as at 35 to each leg 10 with the hooked end 36 thereof engaged over a pin 37 carried by the rear face of the lower transverse brace bar 22 of the back 8.

From the above detailed description of the device, it is believed that the chair formation thereof as illustrated in Fig. 3 will be easily comprehended, it being noted that the supporting legs 9 and 10 are held in perpendicular positions relative to the seat section 7 by the links above described, while pivotal movement of the back section 8 relative to seat section 7 will be prevented in view of the association of the links between these parts.

To cause the creeper to be changed from the chair formation shown in Fig. 3 to the reclining truck form shown in Fig. 5, all of the links are disconnected from the associated pins and moved to a position adjacent the carrying legs at which time the back section 8 will be capable of moving on its pivotal connection 26 with the seat section 7 and the relative angularity of the parts is controlled by the front legs 9 as illustrated in Fig. 5 engaging the ground or other supporting surface. The bottom and rear faces of the seat and back sections respectively are provided with roller casters 38 mounted upon rotatable bearings 39 so that when the device is positioned as illustrated in Fig. 5, the back section 8 may readily roll or change its position with minimum friction. With the parts so arranged, the rear supporting legs 10 are moved upon their pivotal connections 25 to position the same between the adjacent ends of the seat and back sections so that the only parts of the creeper contacting the ground or other support are the rollers 38 and the lower ends of the legs 9.

With the device positioned as illustrated in Figs. 1 and 2, the front legs 9 are moved upon their pivotal connections 16 with the seat braces 14 to lie adjacent said seat braces and to permit the seat sections to be lowered substantially to alinement with the back section 8 whereupon both sections are supported upon the caster rollers 38, and when so arranged, the rear legs 10 are positioned between the seat and back sections as clearly illustrated.

When it is desired to completely fold the creeper for purposes of shipping or storing, the seat section 7 is moved upon the pivotal connection 26 and caused to overlie the back section with the parts superposed and all confined within a small area.

While there is herein shown and described the preferred embodiment of the invention, it is to be understood that minor changes may be made therein without departing from the spirit and scope of the invention as claimed.

What is claimed as new is:—

1. An automobile creeper composed of two body-sustaining sections hinged one to the other and adapted to be swung one relatively to the other into either of two service positions, one position being that in which the two sections extend substantially in common plane, the structure being then adapted to serve as a creeper and to support the recumbent body of a user, and the other position being that in which the two sections extend angularly one respecting the other, in which position the two sections are adapted to serve as seat and back of a chair in which the user seats himself, chair legs pivoted to the structure and adapted to swing and to be secured in position to serve as chair legs when the two sections are in the relative angular positions last indicated, and alternately to be collapsed against the structure, and casters adapted to support the structure when the sections lie extended in a common plane and the legs are collapsed.

2. A combination automobile creeper embodying hinged seat and back sections, forward legs hinged to the seat section, rear legs hinged to the rear section in a manner to fold transversely of the longitudinal axis of the rear section and brace links between the legs, seat, and rear section.

3. A combination automobile creeper embodying hinged seat and back sections, forward legs hinged to the seat section, rear legs hinged to the rear section in a manner to fold transversely of the longitudinal axis of the rear section, brace links between the legs, seat, and rear section, and roller casters carried by the bottom and outer faces of the seat and back sections respectively.

4. A combination automobile creeper embodying hinged seat and back sections, forward legs hinged to the seat section, rear legs hinged to the rear section in a manner to fold transversely of the longitudinal axis of the rear section and to be disposed between the seat and rear sections when in folded position, coöperating means carried by the rear section and legs for engagement with the seat section for holding the rear section in vertical position and alined with the rear legs and coöperating means carried by the rear legs and rear section for holding the rear legs perpendicular relative to the seat section.

In testimony whereof I have hereunto set my hand in presence of two subscribing witnesses.

CHARLES J. GRAZIER.

Witnesses:
W. J. WHITE,
J. W. BARRY.